Sept. 10, 1940.  F. McALLISTER  2,214,171
SERVICE PIPE CLEANOUT TOOL
Filed Oct. 31, 1936
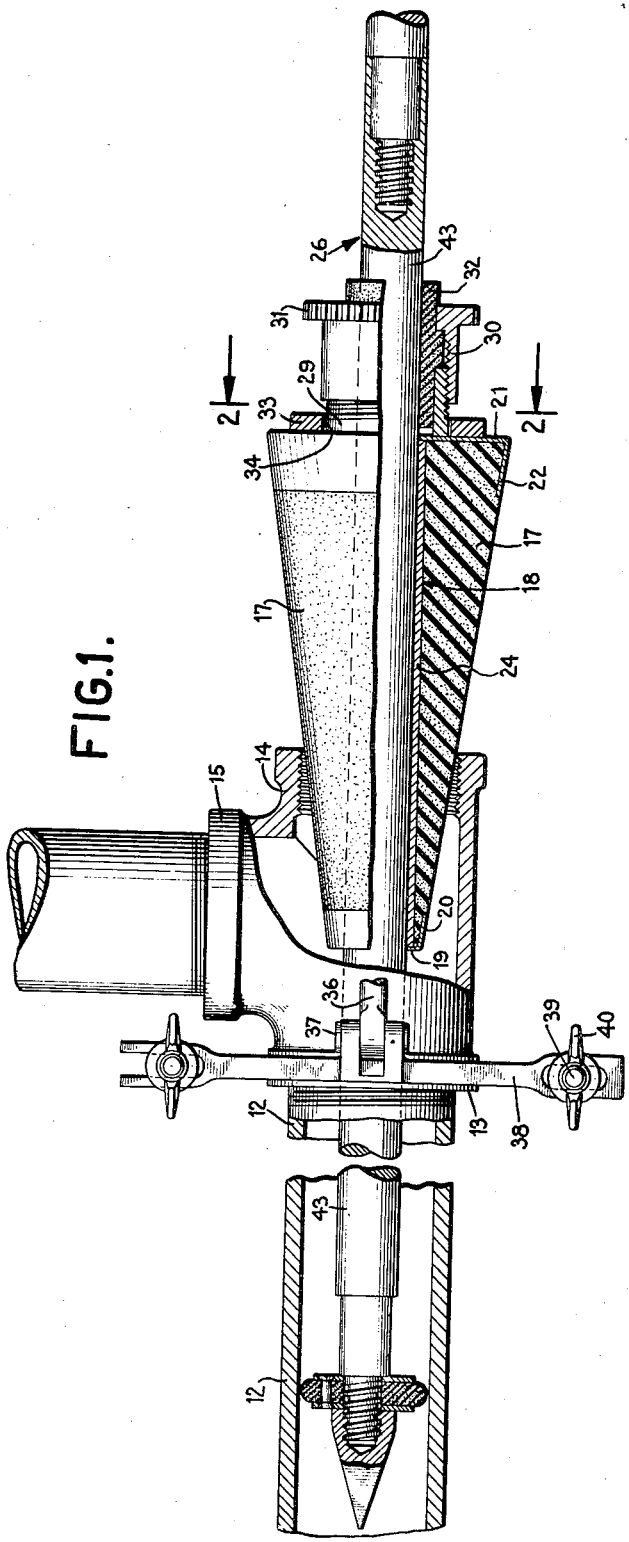
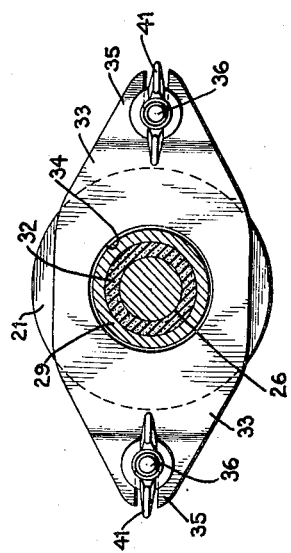
INVENTOR
FRANKLIN McALLISTER
BY
Orton and Griswold
ATTORNEYS Patented Sept. 10, 1940

2,214,171

UNITED STATES PATENT OFFICE 2,214,171

SERVICE PIPE CLEANOUT TOOL

Franklin McAllister, Flushing, N. Y.

Application October 31, 1936, Serial No. 108,607

2 Claims. (Cl. 15—104.05)

This invention relates to devices for cleaning out the service pipe which runs from a gas main in the street into the building. Such a service pipe is generally three-quarter inches to three inches in diameter and runs from a T connected at the upper surface of the gas main to a T within the cellar for connection with the gas meter. This pipe is usually straight and slopes toward the main but frequently has a valve in it outside of the building, say at the curb line.

Service pipes of this character frequently become clogged from rust and corrosion and the tar deposited by the gas. Sometimes also water condenses in the pipe and collects in the bottom. Such water may freeze in winter and completely or substantially close the pipe for almost its entire length. Sometimes the gas company does not have a record of the location of the main.

The primary object of the present invention is a device which may be operated from the interior of the building to clean out obstructions and remove foreign matter from the interior of the service line.

While the subject matter of this invention probably has its greatest applicability to gas mains, it will be obvious as the description proceeds that the invention is equally applicable in any situation where fluid is conducted through a passage, such fluid being either liquid or gaseous or both.

It must be borne in mind that any device for this purpose must prevent the escape of fluid from the service pipe into the building and to this end suitable provision is made, in carrying the invention into effect, to seal the clean-out device while at the same time affording freedom of movement so as to reach any portion of the service pipe.

The invention also resides in details of construction which are practical from the standpoint of ease and cheapness of manufacture and durability and convenience in use.

These and other objects of the invention and the means for their attainment will be more apparent from the following detailed description taken in connection with the accompanying drawing in which:

Figure 1 is a view in side elevation and partly in section showing the cleaning device of this invention applied to a service pipe for fluid of any description;

Figure 2 is a transverse vertical sectional view taken in the plane indicated by the line 2—2 of Figure 1 and looking in the direction of the arrows;

The service pipe from the gas main is indicated at 12. The fluidway of the T on the inside of the building is indicated at 13—14. The side outlet by which connection is made to the meter is indicated at 15. Normally, the inner end 14 of the T is closed by a removable plug, not shown.

When an obstruction is to be removed in the service line 12, the plug is removed and the device of this invention is inserted.

As shown, a plug 17 of yielding and preferably non-metallic material is formed as a frustum of a cone or at least so that the transverse area at the inner end, that is, that end which enters the fluidway 14, is less than the transverse area at the other end without the T. The plug is formed with a longitudinal bore 18. In the interest of durability and particularly where the plug is made of such material as rubber, the smaller end of the plug is tipped with a metallic plate 19 whereof the outer edge is bent inwardly, as at 20, over the peripheral surface of the plug proximate said inner end. Similarly, the outer or larger end of the plug is covered by a plate 21, the outer peripheral edge of which is turned inwardly as a flange 22 overlying the surface of the plug proximate thereto. The bore 18 is also conveniently lined by a metallic tube 24 which is conveniently, but not necessarily, secured at its respective ends to the respective end plates 19 and 21. Obviously, the bore formed by the tube 24 is conveniently on the axis of the plug 17.

It is contemplated that a cleaning rod indicated in its entirety at 26 shall pass through the bore 24 into the service line 12 and while the plug 17 when inserted within the fluidway 14 will, because of its yielding character, form a fluid tight joint between the yielding periphery of the plug 17 and the interior surface of the fluidway 14, it is also contemplated, in accordance with this invention, to seal the space between the tubular lining 24 and the rod 26 since the interior diameter of the tube 24 must necessarily be sufficiently greater than the diameter of the rod 26 to permit freedom of movement of the rod 26 therewithin. Conveniently there is carried with the end wall 21 of the plug an outwardly threaded tubular sleeve 29 forming the male companion member of a stuffing box, the female member of which is indicated at 30, which member 30 is threaded onto the member 29 and adapted to be turned as by the knurled head 31 to compress a gasket 32 of yielding non-metallic material between the stuffing box member 30 and the rod 26 to seal the joint therebetween and prevent the leakage of fluid from the service main 12 from out the space between the tube 24 and the rod 26.

It has been found convenient, in facilitating the actuation of the rod, to retain the plug 17 in position by a frame or the like which shall have clamping engagement with the inner end of the pipe 12 or exterior fluidway portion 13 of the T 13—15. To this end, a yoke or the like, 33, formed with a central aperture 34 is mounted upon the male member 29 of the stuffing box, which member 29 passes through the aperture 34 and is formed with diametrically disposed bifurcated extensions 35 which receive the threaded ends of rearwardly extending rods or arms 36, which rods 36 at their inner ends are pivotally connected, as at 37, with an adjustable clamping frame. The clamping frame is conveniently formed of a pair of opposed clamping member 38 adapted to engage the cylindrical flange on the fluidway 13, for instance, and is drawn into clamping engagement by the bolts 39 and wing nuts 40, as will be understood. The clamping frame 38—40 then being in fixed position, the plug 17 may be drawn tightly into the fluidway 14 by tightening up on wing nuts 41 on the ends of the rods 36 which thereby draws the yoke 33 and with it the end of the plug of larger diameter toward the teeth, as will be understood.

The end of the cleaning rod 26 within the pipe 12 may conveniently carry a cleaning member such as shown and described in my divisional application Serial Number 143,737, filed May 20, 1937 and a tool bit such as shown and described in my divisional application Serial No. 143,738, filed May 20, 1937.

It will thus be seen that a service pipe cleanout device has been provided which serves the purpose of affording a fluid tight joint where it enters the line and is capable of receiving innumerable instruments for removing a variety of obstructions in the interior of the pipe. The rod 26 being in sections can be increased in length so as to reach the end of any service pipe no matter what the distance of the main is from the building. For example, the sections 43 may be of eight foot lengths and may be connected together to extend through a pipe one hundred or one hundred and fifty feet or more in length to remove obstructions or to locate the main in the street. The threaded connection between the rod sections is so designed as to provide a gas tight joint therebetween so no fluid can leak past the stuffing box even during the interval of time that a rod joint is partly within the stuffing box and partly without the same.

Various modifications will occur to those skilled in the art in the composition, configuration and disposition of the component elements going to make up the invention as a whole or in the selection of or combination of desired instrumentalities to accomplish the particular purpose at hand, and no limitation is intended by the phraseology of the foregoing description or illustrations in the accompanying drawing, except as indicated in the appended claims.

What is claimed is:

1. In a device of the character described, in combination, a plug of yielding material for insertion in the end of a fluid passage means the transverse area at one end of the plug being less than the transverse area at the other end and which is formed with a longitudinal bore, sealing means for the bore, means to secure said plug in the passage means comprising means engaging the plug and clamping means engaging the exterior of the passage means and a rod adapted to operate a cleaning tool slidably received in said bore.

2. In a device of the character described, in combination, a plug of yielding material for insertion in the end of a fluid passage means the transverse area at one end of the plug being less than the transverse area at the other end and which is formed with a longitudinal bore, sealing means for the bore, means to secure said plug in the passage means comprising an annulus engaging the outer end of the plug, arms secured thereto and extending longitudinally of the passage means and adjustable clamping means engaging the passage means and connected to the arms and a rod adapted to operate a cleaning tool slidably received in said bore.

FRANKLIN McALLISTER.